US007606605B2

(12) United States Patent
Lee et al.

(10) Patent No.: US 7,606,605 B2
(45) Date of Patent: Oct. 20, 2009

(54) TWO-WAY FOLDER-TYPE TERMINAL

(75) Inventors: Sun-Gi Lee, Seoul (KR); Kang-Hoon Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 515 days.

(21) Appl. No.: 11/068,187

(22) Filed: Feb. 28, 2005

(65) Prior Publication Data
US 2005/0250561 A1 Nov. 10, 2005

(30) Foreign Application Priority Data
May 7, 2004 (KR) .................. 10-2004-0032342

(51) Int. Cl.
*H04M 1/00* (2006.01)
(52) U.S. Cl. .................. 455/575.3; 455/90.3
(58) Field of Classification Search ........... 455/90.3, 455/550.1, 575.3, 575.1
See application file for complete search history.

(56) References Cited
U.S. PATENT DOCUMENTS
6,222,507 B1* 4/2001 Gouko .................. 345/1.1

2001/0044320 A1* 11/2001 Ono et al. ............ 455/550
2004/0106429 A1* 6/2004 Park et al. ........... 455/550.1
2004/0203527 A1* 10/2004 Matsumoto .......... 455/90.3

FOREIGN PATENT DOCUMENTS
FR 2 758 671 12/1997
JP 2001136254 5/2001

* cited by examiner

*Primary Examiner*—Lester Kincaid
*Assistant Examiner*—Phuoc Doan
(74) *Attorney, Agent, or Firm*—The Farrell Law Firm, LLP

(57) ABSTRACT

A two-way folder-type terminal including a first housing; a second housing coupled to the first housing in such a manner that it can be rotated in a direction approaching or away from the first housing while facing it; and a third housing coupled to the first housing at a position spaced from the second housing, the third housing being adapted to be rotated in a direction approaching or away from the first housing while facing it and to be rotated in such a direction that it is twisted at a position away from the first housing. The two-way folder-type terminal can be used as if it were a conventional bar-type terminal, when the second and third housings are folded on the first housing, and can be used to enjoy multimedia programs (e.g., digital TVs and VODs) and mobile games, when the second and third housings are unfolded from the first housing.

18 Claims, 3 Drawing Sheets

TWO-WAY FOLDER-TYPE TERMINAL

PRIORITY

This application claims priority to an application entitled "Two-Way Folder-Type Terminal" filed with the Korean Intellectual Property Office on May 7, 2004 and assigned Serial No. 2004-32342, the contents of which are hereby incorporated by reference.

BACKGROUND OF THE INVENTION

1. Field of the Invention

The present invention relates to a portable terminal, and more particularly to a two-way folder-type terminal having a pair of housings rotatably coupled to another housing at positions spaced apart from each other to expose/cover the latter.

2. Description of the Related Art

In general, portable terminals may be classified into bar-type terminals, flip-type terminals, and folder-type terminals according to their appearance.

The bar-type terminals have a single body housing, on which data input/output means and transmitter/receiver units are positioned. However, they have a problem in that their keypad, which is used as the date input means, is always exposed and a key may be pressed unintentionally. In addition, there exists a limitation in making the bar-type terminals compactly, because a distance must be secured between the transmitter and receiver units of the terminals.

The flip-type terminals have a body, a flip, and a hinge module for connecting the body with the flip. The body has data input/output means and transmitter/receiver units positioned thereon. The flip is adapted to cover the keypad, which is used as the data input means, so that any erroneous operation thereof can be avoided. However, there still exists a limitation in making the flip-type terminals compactly, because a distance must be secured between the transmitter and receiver units of the terminals.

The folder-type terminals have a body, a folder, and a hinge module for connecting the body with the folder in such a manner that the folder can be rotated to open/close them. During a standby mode, the folder is folded onto the body to avoid unintentionally pressing or striking a key and erroneously operating the keypad. During a speech mode, the folder is unfolded to secure a sufficient distance between the transmitter and receiver units. This is beneficial to making the folder-type terminals in a compact size. For this reason, most recent portable terminals are configured as folder-type terminals.

The classification of portable terminals may be easily understood by those skilled in the art.

As portable terminals become used extensively, users' tastes and demands regarding the function and design thereof have become diversified. Accordingly, sliding-type, pop-up-type, and swing-type portable terminals have become commercialized. The trend of making portable terminals in a compact size with reduced weight, on the other hand, must be considered with consideration of the portability of the terminals.

However, conventional bar-type, flip-type, or folder-type terminals have a limitation in adding various functions within a limited area or in changing the design of the terminals. In addition, conventional terminals cannot provide a screen large enough to accommodate recently commercialized multimedia programs (e.g., digital TVs and VODs (videos on demand)) and mobile games. In order to enjoy the mobile games loaded on the portable terminals, more key buttons must be operated to utilize various additional features. However, it is difficult to perform such operations with the limited keypad of conventional terminals.

SUMMARY OF THE INVENTION

Accordingly, the present invention has been made to solve the above-mentioned problems occurring in the prior art, and an object of the present invention is to provide a two-way folder-type terminal making it easy to add additional functions and to cope with design change.

Another object of the present invention is to provide a two-way folder-type terminal capable of securing a screen large enough to watch digital TVs and VODs.

Still another object of the present invention is to provide a two-way folder-type terminal making it convenient to use a function, e.g., a mobile game, which needs various complicated operations.

In order to accomplish this object, there is provided a two-way folder-type terminal including a first housing; a second housing coupled to the first housing in such a manner that it can be rotated in a direction approaching or away from the first housing while facing it; and a third housing coupled to the first housing at a position spaced from the second housing, the third housing being adapted to be rotated in a direction approaching or away from the first housing while facing it and to be rotated in such a direction that it is twisted at a position away from the first housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
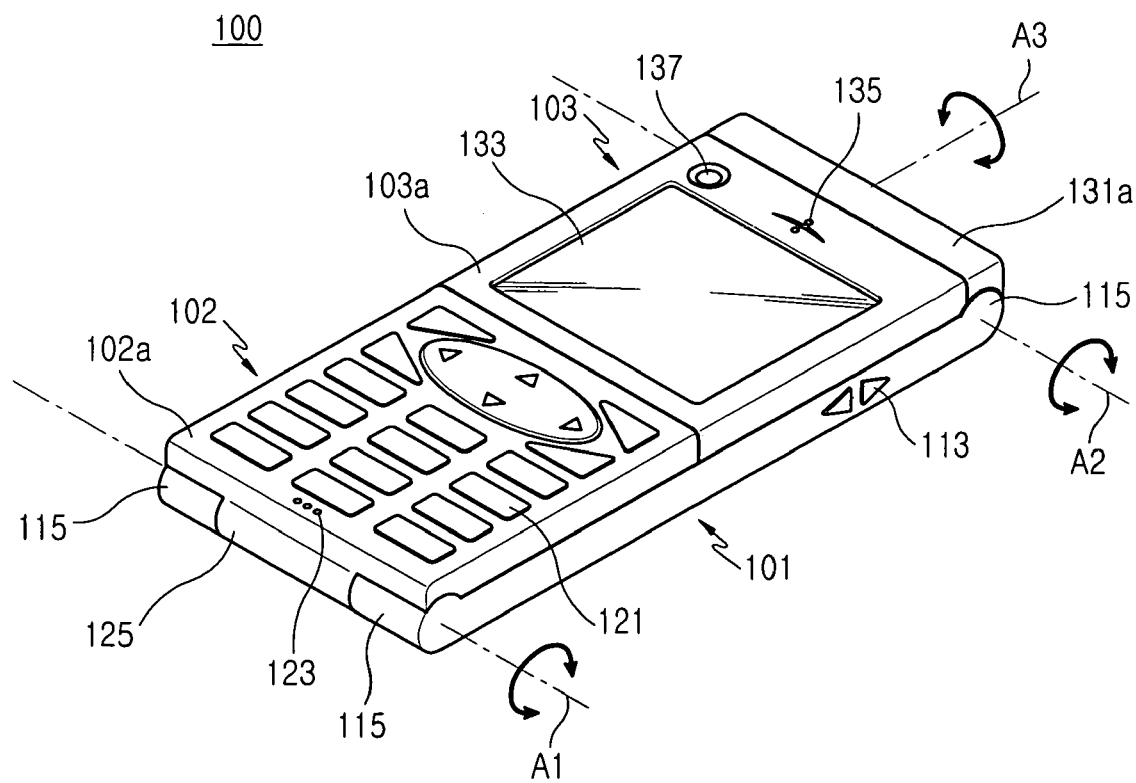
FIG. 1 is a perspective view showing a two-way folder-type terminal with second and third housings in a closed position according to a preferred embodiment of the present invention.

FIG. 1 is a perspective view showing a two-way folder-type terminal 100 according to a preferred embodiment of the present invention with second and third housings in a closed position.

Figure 2:
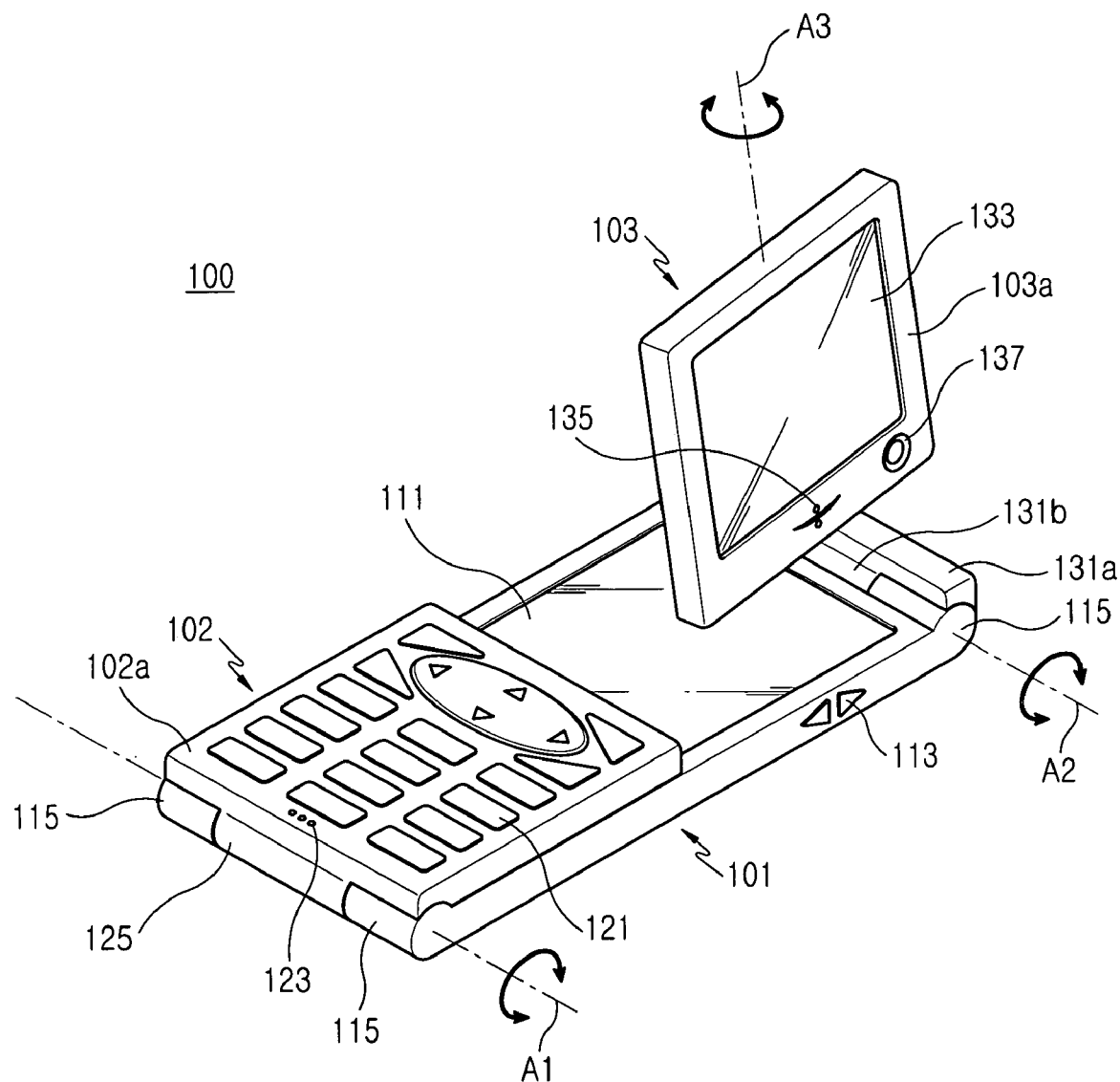
FIG. 2 is a perspective view showing the rotation of a third housing of the two-way folder-type terminal shown in FIG. 1.

FIG. 2 is a perspective view showing the rotation of a third housing 103 of the two-way folder-type terminal 100 shown in FIG. 1 about axis A3.

Figure 3:
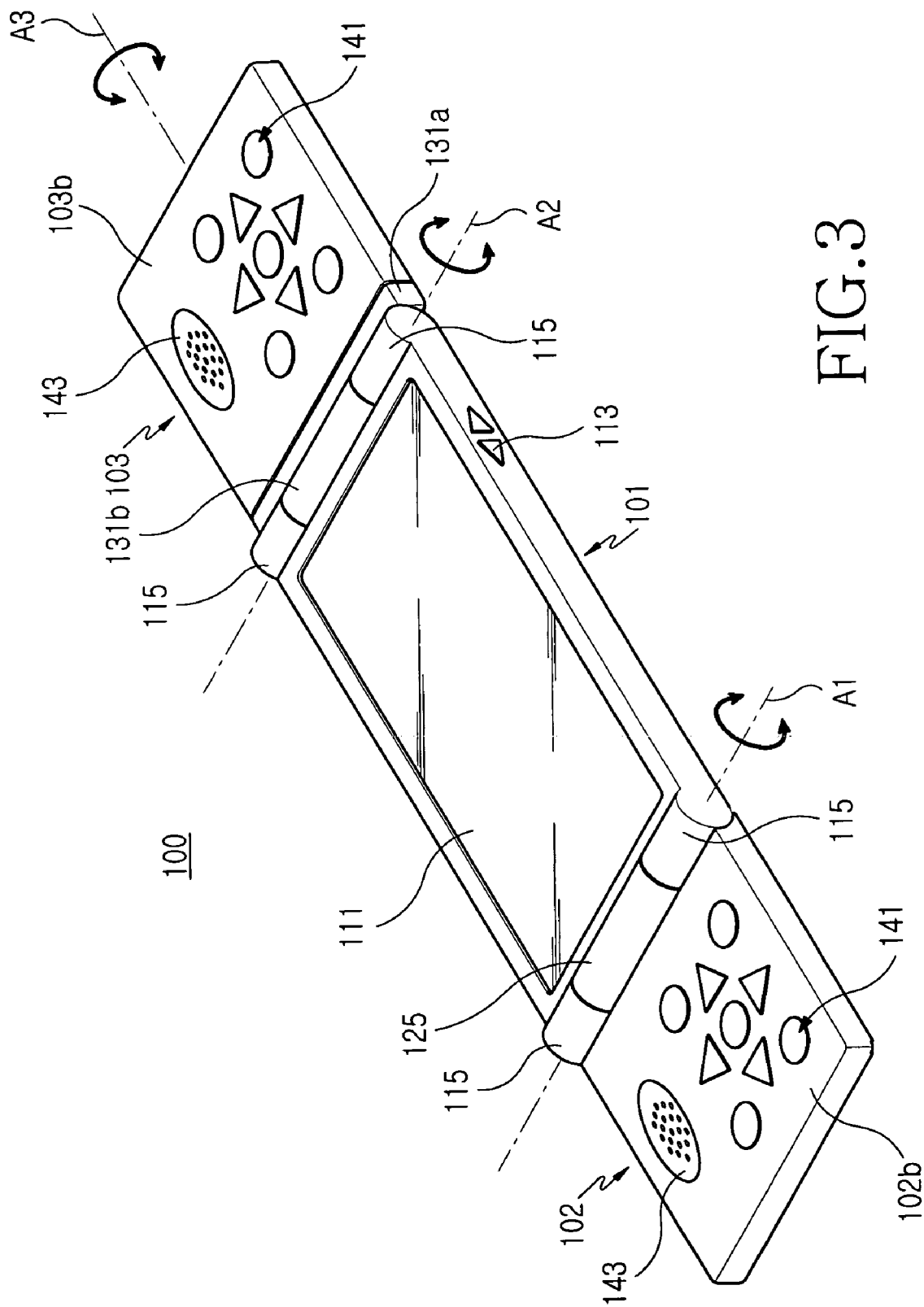
FIG. 3 is a perspective view showing second and third housings, which have been unfolded, of the two-way folder-type terminal shown in FIG. 1.

FIG. 3 is a perspective view showing second and third housings 102 and 103, which have been unfolded, of the two-way folder-type terminal 100 shown in FIG. 1.

As shown in FIGS. 1 to 3, the two-way folder-type terminal 100 according to a preferred embodiment of the present invention includes first, second, and third housings 101, 102, and 103. The second and third housings 102 and 103 are rotatably coupled to opposite ends of the first housing 101.

The first housing 101 has a main display device 111 positioned on a surface thereof; a battery pack (not shown) adapted to be fastened/released on/from the other surface thereof; side hinge arms 115 formed on both ends thereof, while being spaced apart from each other; and an embedded antenna (not shown). Such a configuration guarantees good speech quality. The main display device 111 occupies the entire area of a surface of the first housing 101 to provide a large screen on the portable terminal 100. It is possible to obtain an aspect ratio suitable for the screen provided by service providers of digital TVs or VODs, when the terminal 100 is placed in the lateral direction. It is also possible to enjoy mobile games with the large screen. The first housing 101 has a side key 113 formed on at least one of both lateral surfaces thereof, which is used to adjust the volume or is used as a motion key in a menu screen.

The second housing 102 is coupled to an end of the first housing 101 and is adapted to be rotated in a direction approaching or away from the first housing 101. The second housing 102 has a first center hinge arm 125 formed on an end thereof, which is rotatably coupled between the side hinge arms 115 of one side of the second housing 102. Accordingly, the second housing 102 can be rotated by the side hinge arms 115 and the first center hinge arm 125 about a first hinge axis A1 extending along a longitudinal direction of the terminal.

The main display device 111 has a part which is covered, when the second housing 102 is folded onto the first housing 101, and exposed, when the second housing 102 is rotated away from the first housing 101 to be unfolded.

The second housing 102 has a first keypad 121 positioned on a surface 102a thereof, which is composed of key buttons in a 3×4 arrangement and function keys. The second housing 102 also has a transmitter unit 123, which contains a microphone therein, disposed next to the first keypad 121. The first keypad 121 is exposed, when the second housing 102 is folded onto the first housing 101, and is used for normal operations of portable terminals, such as inputting desired telephone numbers, inputting messages, and calling and selecting menus.

The second housing 102 has a second keypad 141 which is positioned on the other surface 102b thereof and which is composed of arrow keys, selection keys, and mode shift keys for use in mobile games. As such, the second keypad 141 acts as a joystick. When the second housing 102 is folded onto the first housing 101, the second keypad 141 is covered and cannot be used, but, when the second housing 102 is unfolded from the first housing 101, the second keypad 141 is exposed and can be used for mobile games.

A speaker device 143 is positioned next to the second keypad 141 and outputs sound when watching digital TVs and VODs, or when enjoying mobile games.

The third housing 103 is coupled to the other end of the first housing 101 and is adapted to be rotated in a direction approaching or moving away from the first housing 101. The third housing 103 is spaced apart from the second housing 102 and is adapted to expose/cover the remaining part of the main display device 111 not already exposed/covered by the second housing 102. The third housing 103 has a sub-display device 133 positioned on a surface 103a thereof. The third housing 103 also has a receiver unit 135 and a camera lens assembly 137 positioned next to the sub-display device 133, which respectively contain a speaker device and a camera device therein.

The third housing 103 is coupled to the first housing 101 via a hinge base 131a, which is rotatably connected to the opposite end of the first housing 101.

The hinge base 131a has a second center hinge arm 131b positioned on a side thereof. The second center hinge arm 131b is rotatably interposed between the side hinge arms 115 of the other side of the first housing 101. The side hinge arms 115 and the second hinge arm 131b provide a second hinge axis A2, which extends parallel to the first hinge axis A1. As such, the third housing 103 is adapted to be rotated about the second hinge axis A2, and the display device 111 is exposed/covered by the second and third housings 102 and 103.

The third housing 103 is coupled to the hinge base 131a and is adapted to be rotated about a third hinge axis A3, which extends perpendicular to and lies in a common plane as the second hinge axis A2. As such, the third housing 103 can reverse its front and rear surfaces by being rotated about the third housing 103 at a position away from the first housing 101. As the third housing 103 is rotated about the second hinge axis A2, the third housing 103 can be rotated about the third hinge axis A3. Consequently, a user can take pictures of desired objects in various directions, using the camera lens assembly 137 positioned on a surface of the third housing 103.

Referring to FIG. 1, the first keypad 121 and the transmitter unit 123 of the second housing 102 are flush with the sub-display device 133 and the receiver unit 135 of the third housing 103, when the second and third housings 102 and 103 are folded on the first housing 101. In this state, the user can use the two-way folder-type terminal as if it were a conventional bar-type terminal.

The third housing 103 has a third keypad 141 positioned on the other surface 103b thereof, which acts as a joystick just like the second keypad 141. When the third housing 103 is folded on the first housing 101, the third keypad 141 is covered and cannot be used, but, when the third housing 103 is unfolded from the first housing 101, the third keypad 141 is exposed and can be used for mobile games.

A speaker device 143 is positioned next to the third keypad 141 and outputs sound when watching digital TVs and VODs, or when enjoying mobile games.

The second and third keypads 141 and the speaker devices 143 are symmetrically positioned on both sides of the first housing to perform the same functions. When the second and third housings 102 and 103 are unfolded from the first housing 101, the speaker devices 143 provide realistic sound when enjoying multimedia programs and mobile games.

As mentioned above, the two-way folder-type terminal according to the present invention can be used as if it were a conventional bar-type terminal, when the second and third housings are folded onto the first housing, and can be used to enjoy multimedia programs (e.g., digital TVs and VODs) and mobile games, when the second and third housings are unfolded from the first housing. As such, it can be used for applications by users. In addition, it can be carried as if it were a conventional bar-type terminal and can be used with the second and third housings unfolded, if necessary. Accordingly, it is easy to diversify the functions of the terminal. The two-way folder-type terminal according to the present invention also has a large display device suitable for enjoying multimedia programs and keypads acting as a joystick. This makes it convenient to use the terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A two-way folder-type portable wireless communication terminal comprising:
    a first housing;
    a second housing rotatably coupled to the first housing allowing rotation towards and away from the first housing while facing the first housing; and
    a third housing coupled to the first housing at a position spaced from the second housing, the third housing being adapted to rotate towards and away from the first housing while facing first housing,
    wherein the second housing has an outer keypad positioned on a surface thereof, the outer keypad being exposed when the second housing is folded on the first housing and
    wherein the third housing has an outer display device positioned on at least one surface of the third housing, the outer display device being exposed when the third housing is rotated onto the first housing.

2. A two-way folder-type portable wireless communication terminal as claimed in claim 1, wherein the second housing is coupled to an end of the first housing about a first hinge axis extending perpendicular to the longitudinal axis of the first housing.

3. A two-way folder-type portable wireless communication terminal as claimed in claim 2, wherein the third housing is coupled to an opposite end of the first housing about a second hinge axis extending parallel to the first hinge axis.

4. A two-way folder-type portable wireless communication terminal as claimed in claim 3, wherein the third housing is further adapted to rotate about a third hinge axis, which extends perpendicular to and lies in a common plane as the second hinge axis.

5. A two-way folder-type portable wireless communication terminal as claimed in claim 1, further comprising a main display device positioned on a surface of the first housing, the main display device being selectively exposed and covered by the second and third housings.

6. A two-way folder-type portable wireless communication terminal as claimed in claim 1, wherein the first housing has an embedded antenna positioned therein.

7. A two-way folder-type portable wireless communication terminal as claimed in claim 1, wherein the first housing has a side key positioned on at least one lateral surface thereof.

8. A two-way folder-type portable wireless communication terminal as claimed in claim 1, further comprising a receiver unit positioned adjacent to the outer keypad and including a microphone therein.

9. A two-way folder-type portable wireless communication terminal as claimed in claim 1, further comprising an inner keypad positioned on at least one surface of the second housing, the inner keypad being covered, when the second housing is rotated onto the first housing, and the inner keypad being exposed when the second housing is rotated away from the first housing.

10. A two-way folder-type portable wireless communication terminal as claimed in claim 9, wherein the inner keypad provides a joystick function in a game mode.

11. A two-way folder-type portable wireless communication terminal as claimed in claim 9, further comprising a speaker device positioned adjacent to the keypad.

12. A two-way folder-type portable wireless communication terminal as claimed in claim 1, further comprising a receiver unit positioned adjacent to the outer display device and including a speaker device therein.

13. A two-way folder-type portable wireless communication terminal as claimed in claim 1, further comprising a camera lens assembly positioned adjacent to the outer display device and including a camera device therein.

14. A two-way folder-type portable wireless communication terminal as claimed in claim 1, further comprising an inner keypad positioned on at least one surface of the third housing, the keypad being covered, when the third housing is rotated onto the first housing, and the keypad being exposed when the third housing is rotated away from the first housing.

15. A two-way folder-type portable wireless communication terminal as claimed in claim 14, wherein the inner keypad provides a joystick function in a game mode.

16. A two-way folder-type portable wireless communication terminal as claimed in claim 14, further comprising a speaker device positioned adjacent to the inner keypad.

17. A two-way folder-type portable wireless communication terminal as claimed in claim 1, wherein a portion of at least one surface of the first housing is exposed and covered by the second housing, and the remaining portion of the at least one surface of the first housing is exposed and covered by the third housing.

18. A two-way folder-type portable wireless communication terminal as claimed in claim 17, wherein the second housing has a keypad and a transmitter unit positioned on at least one surface thereof, the third housing has a sub-display device and a receiver unit positioned on at least one surface thereof, and the keypad and the transmitter unit are flush with the sub-display device and the receiver unit, when a surface of the first housing is covered by the second and third housings.

* * * * *

UNITED STATES PATENT AND TRADEMARK OFFICE
CERTIFICATE OF CORRECTION

PATENT NO. : 7,606,605 B2 Page 1 of 1
APPLICATION NO. : 11/068187
DATED : October 20, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this

Twelfth Day of October, 2010

David J. Kappos
*Director of the United States Patent and Trademark Office*